E. O. CARTWRIGHT.
SETTLING AND SEPARATING TANK.
APPLICATION FILED APR. 4, 1919.
1,311,639.
Patented July 29, 1919.
4 SHEETS—SHEET 1.
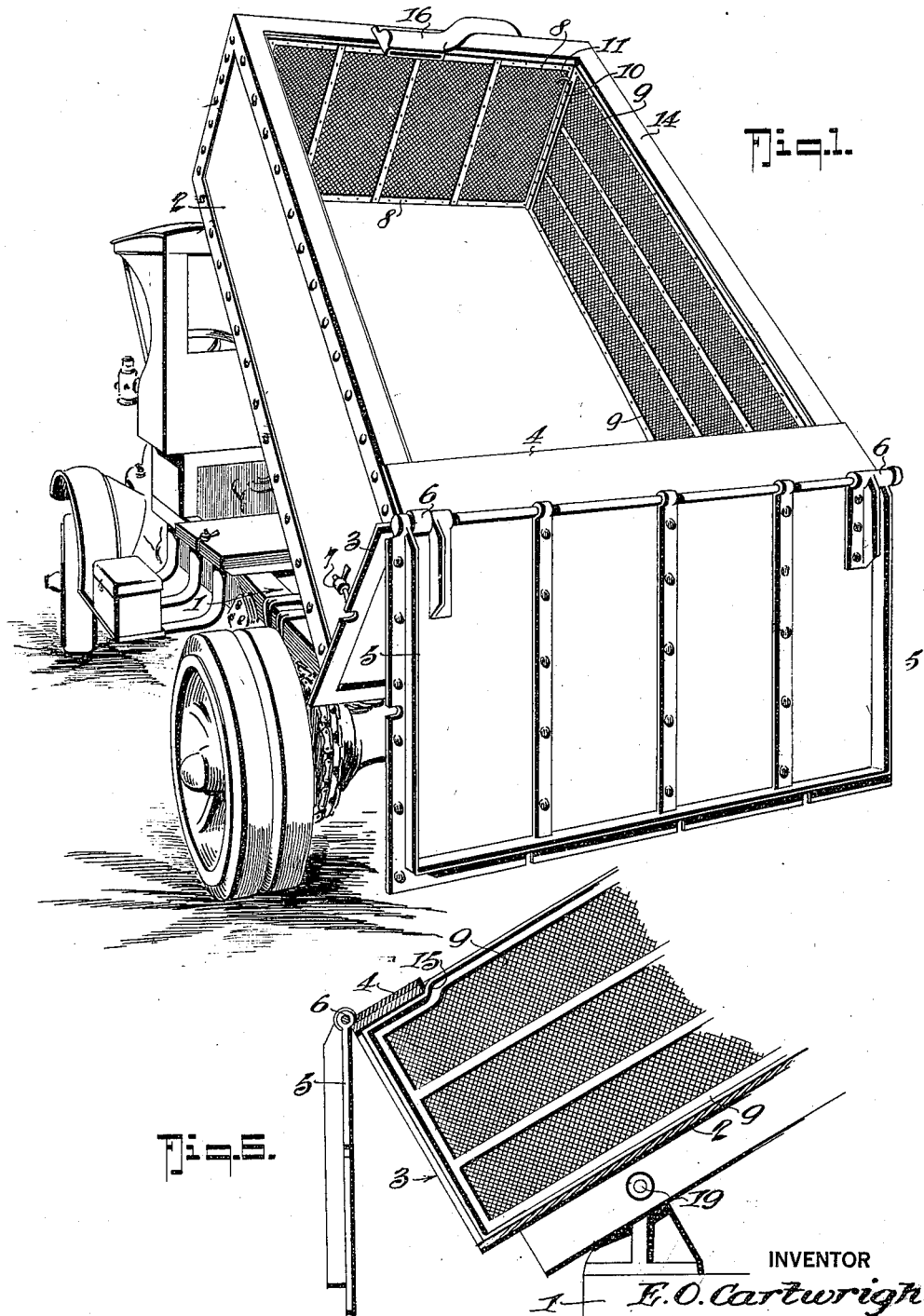
INVENTOR
E. O. Cartwright,
BY
Fred G. Dieterich
ATTORNEYS E. O. CARTWRIGHT.
SETTLING AND SEPARATING TANK.
APPLICATION FILED APR. 4, 1919.
1,311,639.
Patented July 29, 1919.
4 SHEETS—SHEET 2.
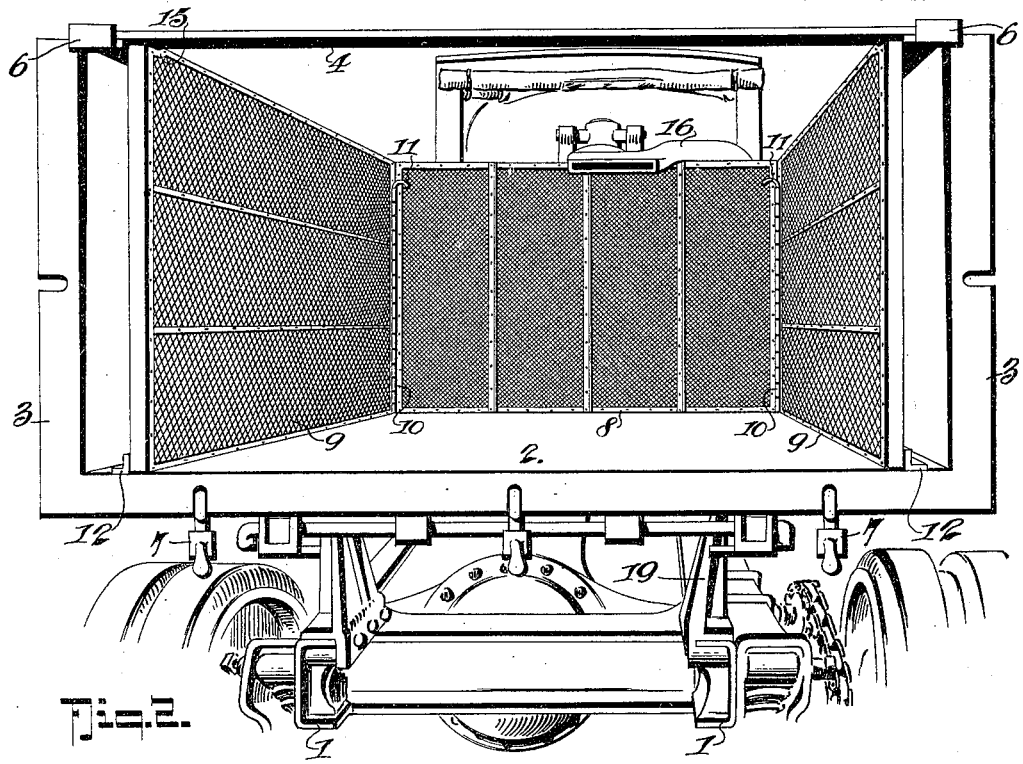
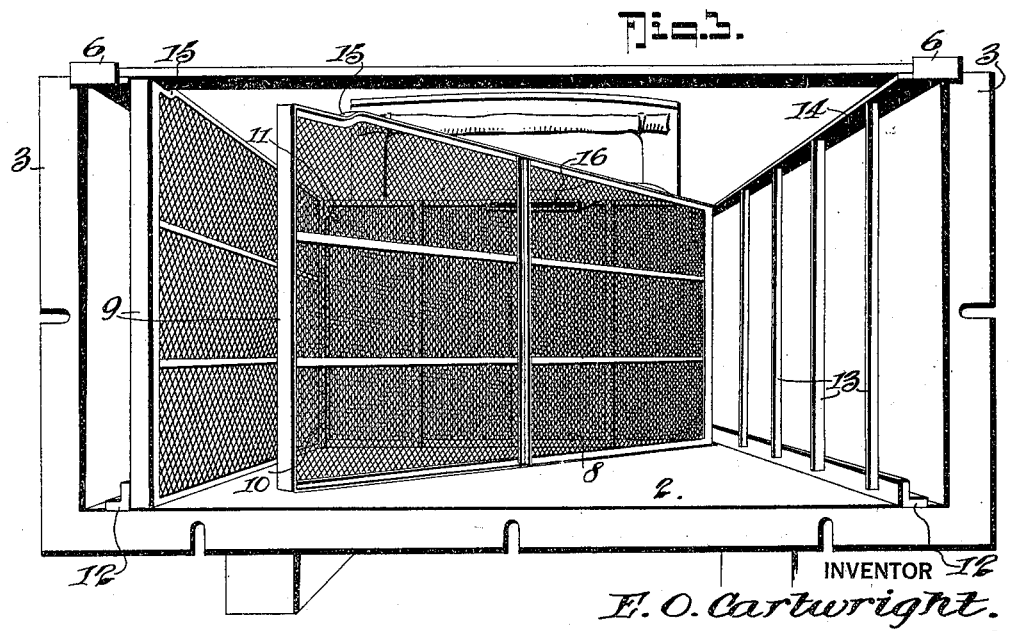
INVENTOR
E. O. Cartwright.
BY
Fred G. Dieterich & Co
ATTORNEYS

E. O. CARTWRIGHT.
SETTLING AND SEPARATING TANK.
APPLICATION FILED APR. 4, 1919.

1,311,639.

Patented July 29, 1919.
4 SHEETS—SHEET 3.

INVENTOR
E. O. Cartwright.
BY
Fred G. Dieterich
ATTORNEYS

THE COLUMBIA PLANOGRAPH CO., WASHINGTON, D. C.

E. O. CARTWRIGHT.
SETTLING AND SEPARATING TANK.
APPLICATION FILED APR. 4, 1919.

1,311,639.

Patented July 29, 1919.
4 SHEETS—SHEET 4.

INVENTOR
E. O. Cartwright.
BY
Fred G. Dieterich
ATTORNEYS

UNITED STATES PATENT OFFICE.

ERNEST O. CARTWRIGHT, OF SPRINGFIELD, OHIO, ASSIGNOR TO CHARLES F. GARDNER, OF SPRINGFIELD, OHIO.

SETTLING AND SEPARATING TANK.

1,311,639. Specification of Letters Patent. Patented July 29, 1919.

Application filed April 4, 1919. Serial No. 287,627.

*To all whom it may concern:*

Be it known that I, ERNEST O. CARTWRIGHT, a citizen of the United States, residing at Springfield, in the county of Clark and State of Ohio, have invented a new and Improved Settling and Separating Tank, of which the following is a specification.

The present invention has for its object to provide a tank which is especially useful in connection with sewer and street cleaning apparatus of the type disclosed in my copending applications filed October 25, 1918, Serial No. 259,668 and March 6, 1919, Serial No. 280,976, although it is a further object of the invention to provide a settling and separating tank of general utility not limited to use in connection with the apparatus aforesaid. Again, the invention has for its special object to provide a tank with a very large screening area whereby to allow a rapid separation of the liquids from the solids and avoid the clogging of the screen to such an extent as would necessitate the use of a screen washer as, for instance, that disclosed in my last copending application aforesaid, during the use of the tank for performing its separating function.

Another object of the invention is to provide a screen structure which is so arranged and designed that it may be easily and conveniently moved aside in order to permit cleaning out the water spaces in back of the screen.

A further object of the invention is to provide a structure in which the screens may be removed from the tank proper when it is desired to use the tank for other purpose and to provide a structure in which the screen sections are held in position within the tank without special appliances such as bolts or fastening devices so that the screens may be readily removed (when the tank is empty) for cleaning purposes, or removed from the tank altogether when desired.

The invention further resides in those novel details of construction, combination and arrangement of parts, all of which will be first fully described and then be specifically pointed out in the appended claims, reference being had to the accompanying drawings, in which:

Figure 1 is a perspective view showing the invention applied to a street cleaning apparatus, such as disclosed in my copending application aforesaid, the tank being in the dumping position.

Fig. 2 is a perspective view looking into the rear end of the tank, the tail gate being removed, the screens being in the normal or operative position.

Fig. 3 is a detail perspective view similar to Fig. 2 showing how the screens may be swung away from the tank wall to permit cleaning of the space between the screen and the tank wall.

Fig. 6 is a detail vertical longitudinal section of the tail end of the tank showing how the gate will swing open by gravity to permit dumping of the contents and also indicating how the screen is held from slipping out when the gate is open.

Figure 4:
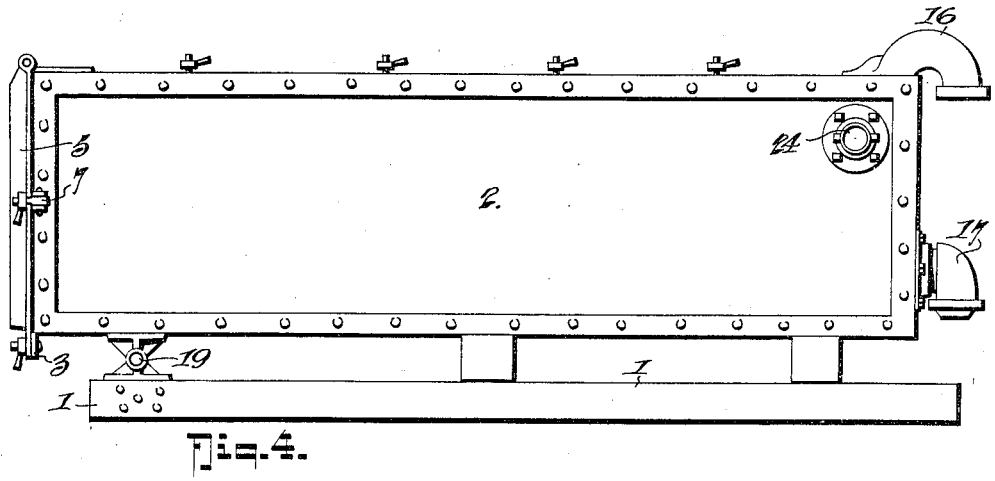
Fig. 4 is a side elevation of a tank constructed in keeping with my invention.
Figure 5:
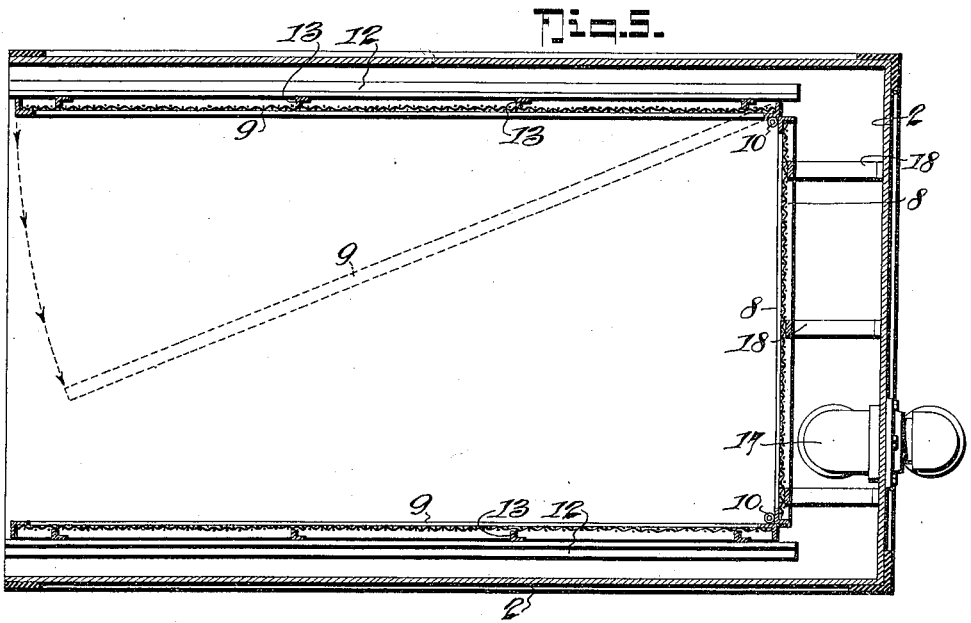
Fig. 5 is a horizontal section of the same.
Figure 7:
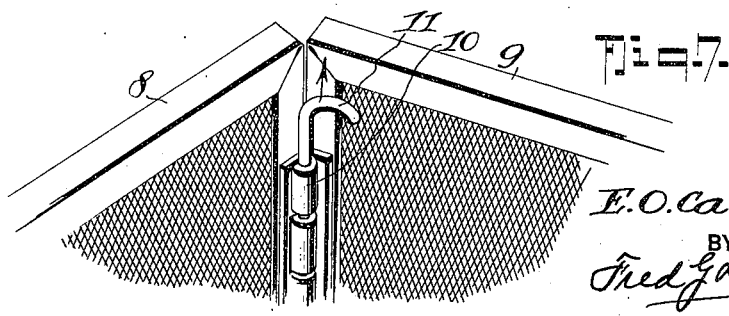
Fig. 7 is an enlarged detail perspective view of one corner of a pair of screens showing the hinge connection and the hinge pin which may be pulled out to separate the screens.

In the drawings in which like numerals of reference indicate like parts in all of the figures, 1 represents the frame on which the tank 2 is hingedly mounted at 19. The frame 1 may constitute the chassis frame of the truck shown in Fig. 1, or it may be unmounted, as shown in Fig. 4, or it may be the frame of a trailer on which the tank can be mounted. The vehicle on which the tank is mounted, *per se*, constitutes no part of the invention.

The tank consists of a bottom, two sides and a front end rigidly united into a fixed structure, the rear of the tank having a flanged mouth 3 adapted to be closed by a tail gate 5 which is hinged across the top at 6 and is secured to the flange 3 in the closed position by suitable fasteners or clamps 7 to effect a fluid-tight fit.

4 is a cross bar connecting the sides of the tank at the rear adjacent to the tail gate and constitutes an integral part of the tank structure, although it may be made removable, if desired. In order to obtain the greatest possible screening area and with maximum rigidity and strength of parts I find that it is possible to provide a screen consisting of three sections, the side sections 9—9 and the front end section 8. These sections are hinged together as at 10 by hinges whose pins 11 may be withdrawn to disconnect the screens one from another.

Figure 8:
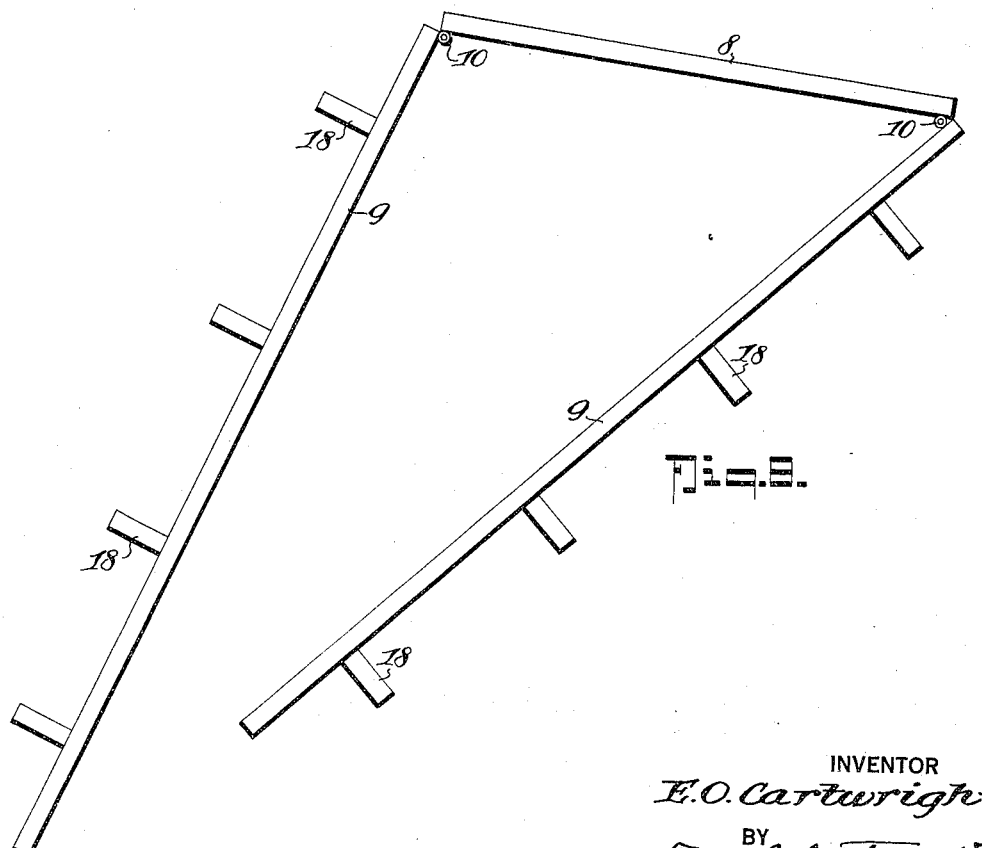
Fig. 8 is a diagrammatic top plan view showing how the spacing frame may be mounted on the screens instead of on the sides of the tank body, thereby leaving the tank body free of all obstructions when it is desired to use the same with the screens removed.

In order to brace the screens and keep them separated a predetermined distance from the side and end walls of the tank, suitable brace frames are provided which may consist of angle irons 12 secured to the floor of the truck (see Fig. 3) and vertical angle irons 13 secured to the angle irons 12 and to the cover strip 14 at the top of the tank, the arrangement being such that when the screens 9 are swung over into their proper position (see Fig. 2) they will be braced by the angle irons 12 and 13 and the water chamber formed between the screen and the tank side will be covered by the strips 14. The same arrangement may be used with relation to the screen 8 and the front of the tank, but I prefer to provide the bracing frames 18 secured to the screen 8 so as to be removed therewith as a unit. When it is desired that the equipment should be such that the tank may be used without the screens, for hauling purposes, for instance, then it will be preferable to form the supporting braces for the side screens 9 on the screens themselves, as indicated at 18 in Fig. 8. Thus, when the screens are removed from the tank there will be no obstructions left in the tank.

In order to hold the screens from slipping out of the tank when dumping, the side screens 9 have their frames offset at 15 to project under a cross bar 4 and be restrained thereby by longitudinal movement in dumping the load.

In the practical use of the invention for separating purposes, the material is deposited into the tank within the confines of the screens 8 and 9 and tail gate 5, the material being deposited usually through a duct 17 into this compartment. The liquid passes through the screen into the chambers formed between the screen and the walls of the tank while the solids are confined by the screens. The liquid is drained from the liquid chamber through an outlet 17 either by pumping it out or by gravity action, depending upon whether or not the present apparatus is used in connection with the portable street cleaning apparatus shown in my applications aforesaid. When used in connection with apparatus for cleaning out sewers or cleaning streets, etc., the duct 16 is the one which conveys the material from the injector of the apparatus into the tank and the duct 17 is the one that communicates with the intake side of the centrifugal pump, as will be clear by reference to the applications aforesaid. Inasmuch as, however, the use of the present invention is not to be understood as limited to that apparatus I do not deem it necessary to illustrate such parts referred to in this application or to describe the same more completely.

Figure 9:
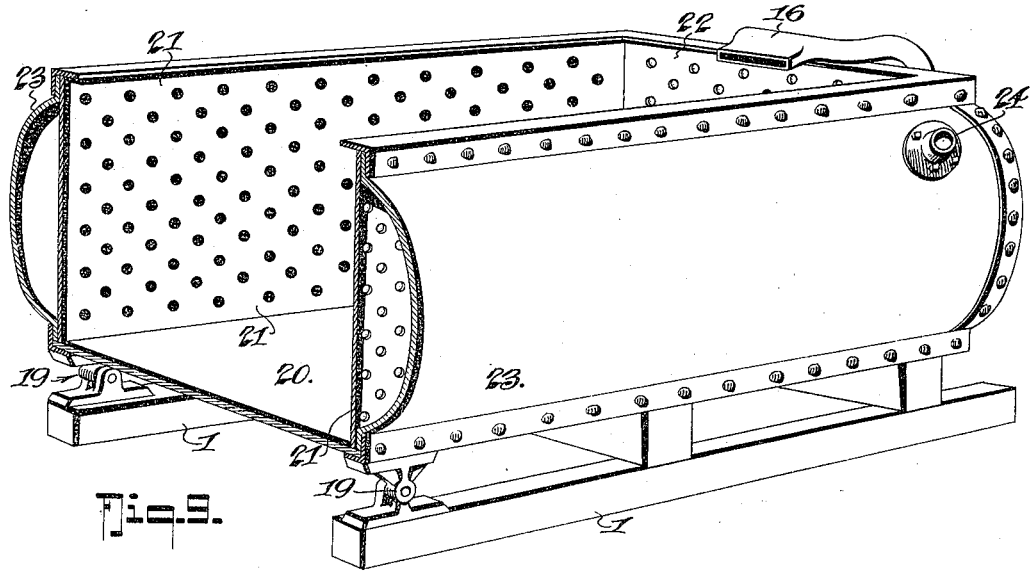
Fig. 9 is a detail perspective view and part cross section showing a modification of the invention.

As a modification of the invention, the tank may be made without the screens being removable, in the manner indicated, for instance, in Fig. 9, by which it will be seen that the tank in this form is composed of a closed or solid bottom 20 and perforated screen sides 21, to the outside of which is riveted or otherwise secured the imperforated metal shells 23 that serve to inclose the water chamber into which the fluid material drains from the screened chamber. The material is pumped into the tank between the side walls 21 and end wall 22 (it being understood that the tail gate shown in the preceding forms is used in this form also) and the tail gate 5, the fluid material passing through the perforations into the chamber within the shell 23, the shell 23 extending around two sides and one end of the tank. The fluid is pumped from the shell 23 through an outlet similar to the outlet 17 of the preceding forms.

24 designates an overflow outlet which is provided for the usual purposes.

Numerous changes in the details of construction of the invention may be made without departing from the spirit of the invention or the scope of the appended claims.

It will be observed that with my arrangement I have provided the greatest practicable proportion of the entire dimensions of the tank as a receiving chamber for the contaminated liquid injected into the tank, to the end that a maximum amount of solids can be accumulated without interfering with the escape from the contaminated mass, of the liquid contained in it, and by encompassing the mass with the large area of screening surfaces shown, a quick separation of the liquid from the mass is made possible and the liquid chamber or space is reduced to the minimum.

What I claim is:—

1. A separating tank comprising an outer impervious shell, transverse and longitudinal screen partitions within said shell dividing the same into an outer water compartment and an inner solids compartment into which latter compartment the material to be separated is placed, said shell having a discharge end, a tail gate over the discharge end for closing the adjacent ends of the water compartment and also the center compartment substantially as shown and described.

2. A tank comprising a bottom, an end wall and side walls, means for mounting said tank to dump through its open end, a transverse screen, at least one longitudinal screen hinged to said transverse screen, said screens dividing the tank into a solids compartment and a liquid compartment, and a tail gate for closing the adjacent ends of both of said compartments.

3. A tank comprising a bottom, an end wall and side walls, means for mounting said tank to dump through its open end, a transverse screen, at least one longitudinal screen hinged to said transverse screen, said screens dividing the tank into a solids compartment and a liquid compartment, a tail gate for closing the adjacent ends of both of said compartments, and means for tiltably mounting said tank so that the contents may be dumped.

4. A tank comprising a bottom, side and end walls and a tail gate, a screen held transversely in said tank near the end wall, longitudinally held screens within the tank and extending from the transverse screen to the tail gate, said screens dividing said tank into a central receiving chamber and side and end water compartments, and means for holding said screens spaced from the tank walls.

5. A separating tank comprising a bottom, side and end walls, and a tail gate; means for mounting said tank to dump the contents through the tail end when the gate is opened, a perforated partition in said tank extending along both sides and across the front end of the tank, spacing devices for holding said partition spaced from the adjacent tank walls, and means in virtue of which said partition may be moved away from the tank walls for cleaning purposes.

6. A separting tank comprising a bottom, side and end walls, and a tail gate; means for mounting said tank to dump the contents through the tail end when the gate is opened, a perforated partition in said tank extending along both sides and across the front end of the tank, spacing devices for holding said partition spaced from the adjacent tank walls, means in virtue of which said partition may be moved away from the tank walls for cleaning purposes, said means comprising a hinge connection between the end sections and the side sections of the partition.

7. A tank comprising a bottom, side walls, an end wall and a tail gate, a cross bar adjacent to the tail gate extending from one side to the other, an end screen located transversely of the tank adjacent to the end wall of the tank, a pair of side screens hinged at one end to the ends of the transverse end screen and having offset portions to extend under the cross bar and be restrained thereby.

8. A tank comprising a bottom, side walls, an end wall and a tail gate, a cross bar adjacent to the tail gate extending from one side to the other, an end screen located transversely of the tank adjacent to the end wall of the tank, a pair of side screens detachably hinged at one end to the ends of the transverse end screen and having offset portions to extend under the cross bar and be restrained thereby.

9. A tank comprising a bottom, side walls, an end wall and a tail gate, a cross bar adjacent to the tail gate extending from one side to the other, an end screen located transversely of the tank adjacent to the end wall of the tank, a pair of side screens hinged at one end to the ends of the transverse end screen and having offset portions to extend under the cross bar and be restrained thereby, spacing braces between the tank walls and the screens, said side screens extending to the tail gate whereby the said gate will function as an end closure for the chamber within the confines of the screen and for the chamber between the screen and the adjacent walls of the tank.

10. A tank comprising a bottom, side walls, an end wall and a tail gate, a cross bar adjacent to the tail gate extending from one side to the other, an end screen located transversely of the tank adjacent to the end wall of the tank, a pair of side screens hinged at one end to the ends of the transverse end screen and having offset portions to extend under the cross bar and be restrained thereby, spacing braces between the tank walls and the screens, and cover strips for closing over the spaces between the tank walls and the screens.

11. A tank comprising a bottom, side walls, an end wall and a tail gate, a cross bar adjacent to the tail gate extending from one side to the other, an end screen located transversely of the tank adjacent to the end wall of the tank, a pair of side screens hinged at one end to the ends of the transverse end screen and having offset portions to extend under the cross bar and be restrained thereby, spacing braces between the tank walls and the screens, cover strips for closing over the spaces between the tank walls and the screens, said spacer braces being bodily removable from the tank with the screens.

12. A tank comprising a bottom, side walls, an end wall and a tail gate, a cross bar adjacent to the tail gate extending from one side to the other, an end screen located transversely of the tank adjacent to the end wall of the tank, a pair of side screens hinged at one end to the ends of the transverse end screen and having offset portions to extend under the cross bar and be restrained thereby, spacing braces between the tank walls and the screens, said side screens extending to the tail gate whereby the said gate will function as an end closure for the chamber within the confines of the screens and for the chamber between the screen and the adjacent walls of the tank, said hinge connection of said screens including separable hinge elements on the screens and a removable hinge pin connecting said elements.

13. A tank comprising a bottom, side and end walls, means for mounting said tank so it may dump, transverse and longitidunal screen partitions arranged in said tank and dividing the same into a center receiving chamber, an outer liquid chamber located between said screens and the tank walls, and a tail gate for said tank functioning as an end closure for the chamber within the confines of the screen.

14. A tank comprising a bottom, side and end walls, means for mounting said tank so it may dump, transverse and longitudinal screen partitions arranged in said tank and dividing the same into a center receiving chamber, an outer liquid chamber located between said screens and the tank walls, said screens being removably hinged together and means for bracing said means apart from the tank walls.

ERNEST O. CARTWRIGHT.

Copies of this patent may be obtained for five cents each, by addressing the "Commissioner of Patents, Washington, D. C."